United States Patent
Aubert et al.

(10) Patent No.: US 7,613,255 B2
(45) Date of Patent: Nov. 3, 2009

(54) METHOD FOR ESTIMATING COMMUNICATION CONDITIONS AFFECTING AN UWB WIRELESS LINK

(75) Inventors: Louis-Marie Aubert, Rennes Cedex (FR); Stephane Paquelet, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 666 days.

(21) Appl. No.: 11/209,769

(22) Filed: Aug. 24, 2005

(65) Prior Publication Data

US 2006/0056504 A1 Mar. 16, 2006

(30) Foreign Application Priority Data

Sep. 13, 2004 (EP) .................................. 04292200

(51) Int. Cl.
*H04L 27/06* (2006.01)
(52) U.S. Cl. ..................... 375/340; 375/237; 375/238; 375/239; 375/242; 375/254
(58) Field of Classification Search ......... 375/237–239, 375/242, 254, 340
See application file for complete search history.

(56) References Cited

U.S. PATENT DOCUMENTS 3,838,413 A * 9/1974 Wehrmann ................. 341/170
2001/0053175 A1 12/2001 Hoctor et al.
2005/0249276 A1 * 11/2005 Yu ............................. 375/238

OTHER PUBLICATIONS

Stephane Paquelet et al., "An Impulse Radio Asynchronous Transceiver for High Data Rates", Ultra Wideband Systems, 2004. Joint With Conference on Ultrawideband Systems and Technologies. Joint UWBST & IWUWBS. 2004 International Workshop on Kyoto, Japan May 18-21, 2004, Piscataway, NJ, USA, IEEE, May 18, 2004, pp. 1-5.
Carlson A B, "Communication Systems An Introduction to Signals and Noise in Electrical Communications, Passage", Baseband Digital Transmission, XP-002285749, 1986, pp. 391-396.
Shalaby H.M.H. , "Optical OPPM-CDMA receivers with chip-level detectors" IEE Proceedings: Communications, Institution Of Electrical Engineers, vol. 148, No. 1, Feb. 13, 2001, pp. 31-37.

* cited by examiner

*Primary Examiner*—Curtis B Odom
(74) *Attorney, Agent, or Firm*—Oblon, Spivak, McClelland, Maier & Neustadt, L.L.P.

(57) ABSTRACT

The present invention relates to a method for transmitting data by means of at least one pulse sequence carried by a radio signal, in the course of which a power value representative of an amount of power carried by said pulse sequence is computed. The method according to the invention provides estimated values of noise affecting the radio transmission and of an amount of power which would be carried by each pulse sequence in the absence of noise, respectively, prior to the determination of a threshold value to which the power value is to be compared. The knowledge of such estimated values enables to compute a threshold value adapted to the communication conditions affecting any given pulse sequence, and hence to perform an optimal demodulation of any power-modulated UWB signal.

13 Claims, 4 Drawing Sheets

METHOD FOR ESTIMATING COMMUNICATION CONDITIONS AFFECTING AN UWB WIRELESS LINK

BACKGROUND OF THE INVENTION

The present invention relates to a method for transmitting data by means of at least one pulse sequence carried by a radio signal, which method includes at least one symbol decoding step to be executed at the receiver end, in the course of which symbol decoding step a power value representative of an amount of power carried by said pulse sequence is produced and compared to a predetermined threshold value.

Such telecommunication systems are currently studied with the aim of assessing the relevance of so-called Ultra-Wide Band transmission techniques (further referred to as UWB systems and techniques, respectively). In such a system, each transmitter may be identified by a signature formed by chip numbers identifying respective positions of the pulses within associated time windows, which signature is in itself quite sturdy and may thus be reliably and accurately communicated to all potential receivers.

The pulses used in UWB systems are very short, having for example a duration lower than 1 nanosecond, which offers to such systems bandwidths at least as large as 7.5 GigaHertz, entailing high flexibility and hence numerous possible applications for such systems.

SUMMARY OF THE INVENTION

A pulse sequence as described above may form a carrying signal on which information can be encoded by modulation of said carrying signal. The inventors have observed that, because of the shortness of the pulses involved, a precise synchronization with a given pulse sequence may be difficult to perform at the receiver end, so that the chosen modulation scheme should preferably involve as few time-related parameters as possible in order to be cost-efficient. The inventors thus have chosen a modulation scheme according to which the information carried by pulse sequences may be recovered at the receiver end without having to map precisely, with respect to time, the received pulse sequences, which purpose is achieved by multiplying each pulse sequence by a value representative of a symbol to be carried by said pulse sequence, so that the information carried by signals transmitted accordingly may essentially be represented by the power carried by these signals, which power is related to the amplitude of the pulses included within such a signal.

This is why the inventors have chosen to implement the symbol decoding step by comparing a power value representative of an amount of power carried by each pulse sequence to at least one predetermined threshold value, which enables to achieve a demodulation of a modulated UWB symbol in a very straightforward manner.

The threshold value must, however, be computed beforehand, preferably by equating a first and a second probability density function representing a likelihood for the transmitted signal to carry a first symbol and a likelihood for the transmitted signal to carry a second symbol, respectively. Indeed, though a predermined threshold value may be predefined and for example set at ½ or ¾ if the value representative of the symbol to be carried by any given pulse sequence is to be chosen among integer values 0 and 1, the inventors have observed that such fixed thresholds, which do not take into account communication conditions between the transmitter end the receiver may generate decoding errors. The inventors thus have designed a thresholding scheme carried out by equating two probability densities, each taking into account real-time communication conditions, so that neither gray zone nor overlap will exist between two interpreting conditions.

The computation of suitable threshold value thus involves knowledge of the communication conditions having affected the transmission of the received pulse sequence in relation with which a power value will be compared to said threshold value.

The invention provides a computation scheme and computation means for estimating parameters representative of such real-time communication conditions in a cost effective manner.

Indeed, according to a first aspect of the invention, a method as described in the opening paragraph further includes a first parameter representative of noise affecting the transmission of the radio signal and at least one estimation of a second parameter representative of an amount of power which would be carried by each pulse sequence in the absence of noise are performed before determination of the predetermined threshold value.

As will be explained hereinafter, the inventors have found that the knowledge of estimated values of the first and second parameters as defined above is sufficient for allowing computation of a threshold value optimally adapted to the communication conditions to which any given pulse sequence will have been subjected.

The first and second parameters may considered as uncorrelated or, conversely, as interdependent. In a specific embodiments of the invention, an estimated value of the first parameter is used for performing the estimation of the second parameter.

Such a specific embodiment of the invention will allow to re-use results of computations already executed for obtaining the first parameter during the computation of the second parameter, which allows to save computational resources.

According to an advantageous embodiment of the invention, a method as described hereinbefore will further include:
  a reference transmission step in the course of which a frame of reference pulse sequences is transmitted by means of said radio signal,
  a plurality of symbol decoding steps, each intended to produce a power value related to one of the pulse sequences included in the reference frame, and
  an initial parameter estimation step in the course of which estimated values of the first and second parameters are computed on the basis of power values related to pulse sequences included in the reference frame, and of a previous knowledge of the data carried by the reference pulse sequences, which previous knowledge will have been memorized at the receiver end beforehand.

This advantageous embodiment of the invention only requires transmission of a frame of reference pulse sequences for allowing a decoding of all following data frames. A reference data frame of which the successive reference pulse sequences shall be representative will be memorized within each terminal intended to be used in a UWB telecommunication system according to the invention, preferably by programmation of a Read Only Memory during the manufacturing of said terminal.

The estimated values of the first and second parameters may be computed once and for all for any given communication after analysis of all received reference pulse sequences. A preferred embodiment of the invention allows, however, a dynamic adjustment of said estimated values, which will enable to take into account changes in the communication conditions affecting data transmission during an ongoing communication. In order to achieve such a dynamic adjustment, a method as described hereinbefore will further include at least one parameter tuning step for updating previously computed estimated values of the first and second parameters on the basis of at least one new power value produced after computation of the previous estimated values.

According to a particular embodiment of the symbol decoding step, the threshold value may be defined by a polynomial of a variable $M^{1/2}$, where M is defined by $M=(2.B.Ns.Ti+1)/2$, where Ns is the number of pulses included in a single pulse sequence, B being a bandwidth of the pulse sequence for which the threshold value is computed, and Ti a time duration over which an integration of each pulse belonging to said pulse sequence is performed in order to produce the power value related to said pulse sequence.

As will be explained hereinafter, the polynomial defining the threshold value will preferably be limited to the second order in order to achieve a suitable balance between computing complexity and decoding efficiency.

According to a preferred embodiment of the invention, a first-order coefficient of the polynomial defining the threshold value is given by an ordinate of a curve whose abscissa is formed by a ratio between the second and first estimated values related to the transmission of the relevant pulse sequence.

The modulation of the UWB signals to be demodulated by carrying out such a symbol decoding step may result from various modulation schemes.

According to a particular embodiment of the invention, a method as described hereinbefore further includes at least one symbol encoding step to be executed before transmission of said pulse sequence, in the course of which symbol encoding step each pulse sequence is multiplied by an integer value representative of a symbol to be carried by said pulse sequence.

By virtue of this modulation scheme, the information carried by signals transmitted in Ultra-Wide Band telecommunication systems according to the invention will essentially be related to the power carried by these signals, which power is related to the amplitude of the pulses included within such a signal. Such a modulation scheme is easy to implement, which in turn enables to manufacture adapted transmitters at a relatively low cost.

According to a variant of the invention, each signal to be transmitted is constituted by a superimposition of a predetermined number of pulse sequences, each pulse sequence having been subjected to a symbol encoding step and corresponding to one of several sub-bands into which a total bandwidth available for transmission has previously been divided.

This variant of the invention enables to transmit simultaneously several symbols through a same communication channel, and thus to significantly increase the throughput of a telecommunication system in which such a variant of the invention is embodied.

According to one of its hardware-oriented aspects, the invention also relates to a telecommunication system including at least one transmitter and one receiver, said transmitter being intended to transmit a signal formed by at least one pulse sequence, said receiver including symbol decoding means for producing a power value representative of an amount of power carried by said pulse sequence and comparing said power value to a predetermined threshold value, system characterized in that the receiver includes parameter estimation means for performing at least one estimation of a first parameter representative of noise affecting the transmission of the radio signal and at least one estimation of a second parameter representative of an amount of power which would be carried by each pulse sequence in the absence of noise are performed before determination of the predetermined threshold value.

According to another of its hardware-oriented aspects, the invention also relates to a device intended to receive a signal formed by at least one sequence of pulses, said device including symbol decoding means for producing a power value representative of an amount of power carried by said pulse sequence and comparing said power value to a predetermined threshold value, which device is characterized in that it further includes parameter estimation means for performing at least one estimation of a first parameter representative of noise affecting the transmission of the radio signal and at least one estimation of a second parameter representative of an amount of power which would be carried by each pulse sequence in the absence of noise are performed before determination of the predetermined threshold value.

BRIEF DESCRIPTION OF THE DRAWINGS

The characteristics of the invention mentioned above, as well as others, will emerge more clearly from a reading of the following description given in relation to the accompanying figures, amongst which.

DESCRIPTION OF THE PREFERRED EMBODIMENTS

Figure 1:
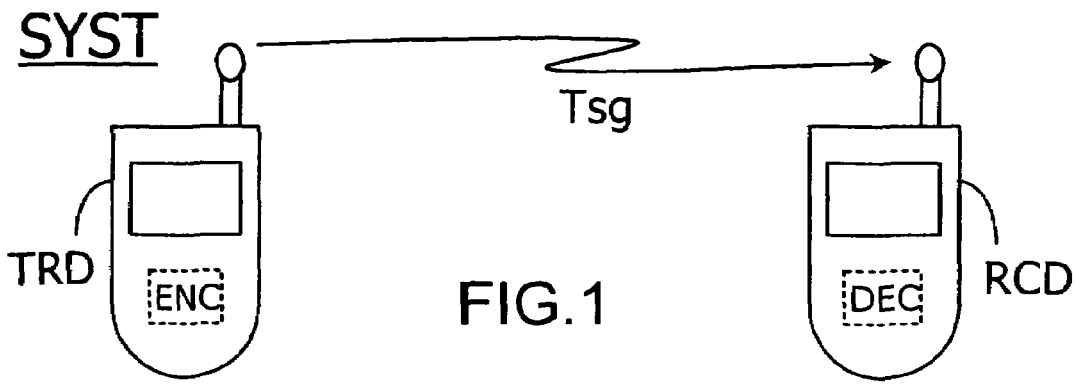
FIG. 1 is a functional diagram depicting a telecommunication system in which the invention is used.

FIG. 1 depicts a telecommunication system SYST in which the present invention is embodied. This system SYST includes at least one transmitter TRD and one receiver RCD, which may for example be both constituted by devices such as mobile phones. The transmitter TRD is intended to transmit a signal Tsg formed by at least one sequence of Ns pulses pj (for j=1 to Ns) over Ns time windows, each pulse being enclosed within a time chip whose position within its relevant time window is defined by a chip number cj (for j=1 to Ns). The number Ns of pulses included in this sequence may, for example, be chosen equal to 128, while the width of each time window may be chosen equal to 100 nanoseconds, with a width of 1 nanosecond for each time chip.

According to the present invention, the transmitter TRD includes symbol encoding means ENC intended to multiply each pulse sequence by an integer value representative of a symbol to be carried by said pulse sequence.

The information carried by the transmitted signal Tsg will thus essentially be related to the power carried by this signal Tsg, which power is related to the amplitude of the pulses included within said signal Tsg. This information may then be recovered by the receiver RCD without said receiver RCD having to map precisely, with respect to time, the received pulse sequences.

To this end, the receiver RCD includes symbol decoding means DEC intended to compute at least one power value representative of an amount of power carried by each pulse sequence and to compare said power value to at least one predetermined threshold value. As will be explained hereinafter, the result of such a comparison will automatically point to the demodulated value of the symbol originally encoded within the transmitted signal Tsg by the symbol encoding means ENC.

Figure 2:
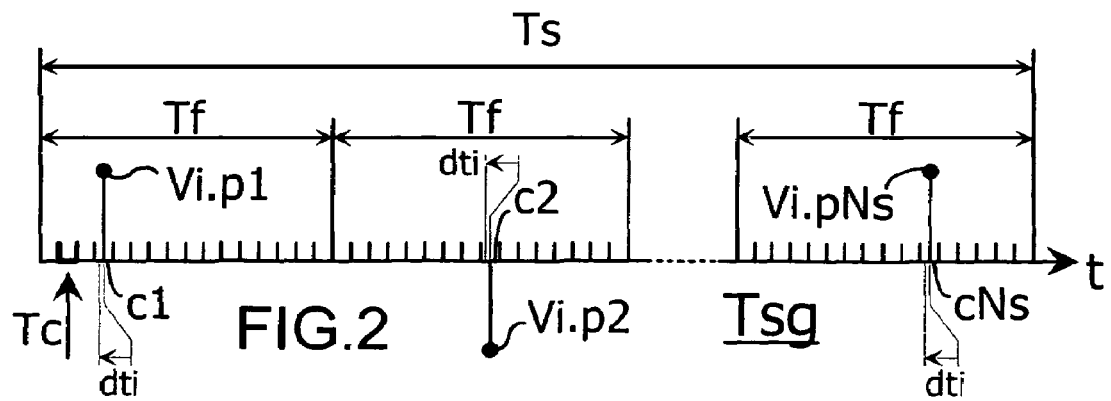
FIG. 2 is a chronogram depicting a pulse sequence constituting a carrying signal transmitted in such a telecommunication system.

FIG. 2 depicts such a transmitted signal Tsg in the form of a chronogram, according to which each pulse sequence has a total duration duration Ts divided into time windows having each a duration Tf, each time window being sub-devided into time chips Tc, a single time chip within each window being intended to enclose a pulse pj (for j=1 to Ns), which single time chip is identified by means of a chip number cj. The transmitter of this transmitted signal Tsg will thus be identified by a signature Sg=(c1, c2 . . . cNs) jointly formed by all above-mentioned chip numbers cj (for j=1 to Ns), which signature Sg is in itself quite sturdy and may be reliably and accurately communicated to all potential receivers.

In accordance with the invention, each pulse pj (for j=1 to Ns) belonging to the pulse sequence shown in this picture has been multiplied by a same integer value Vi representative of a symbol to be carried by said pulse sequence, in the form of the power carried by this sequence, the reference "i" being indicative of a reference number allocated to the pulse sequence under consideration.

Furthermore, the pulses pj (for j=1 to Ns) are multiplied by values αj which are randomly chosen equal to +1 or −1 in the course of the symbol encoding step, so that in the example shown here, the second pulse p2 is negative.

Such a random distribution of positive and negative pulses, which does not affect the information carried by said pulses because said information is related to a square form of said pulses, allows to prevent appearance of high-amplitude peaks in the spectral domain, which peaks could interfere with equipment not included in the telecommunication system. Such frequency interference should be limited as a rule, and is targeted by a European Commission Directive 83/336 CEE, as well as by regulation of the USA's Federal Communications Commission.

All pulses pj (for j=1 to Ns) of the pulse sequence shown here may additionnally be submitted to a time jitter dti in the course of the symbol encoding step.

This time-jitter, introduced by time-delaying means, will be kept small with respect to a delay spread induced by a communication channel through which the modulated signal will be transmitted. The delay spread may have, for example, a value of 100 nanoseconds. Such a time-jitter won't affect the information carried by each pulse sequence, and mainly adds an optional degree of flexibility to the modulation scheme according to the invention.

The transmitted signal Tsg may thus be expressed in the following form:

$$Tsg(t) = \sum_{i,j} Vi \cdot \alpha j \cdot pj(t - cj - j \cdot Tf - dti)$$

In the present application, the information to be carried by the transmitted signal Tsg will be of a binary nature, so that the integer value Vi representative of a bit to be carried by said pulse sequence will either be equal to 1 or to 0.

Figure 3:
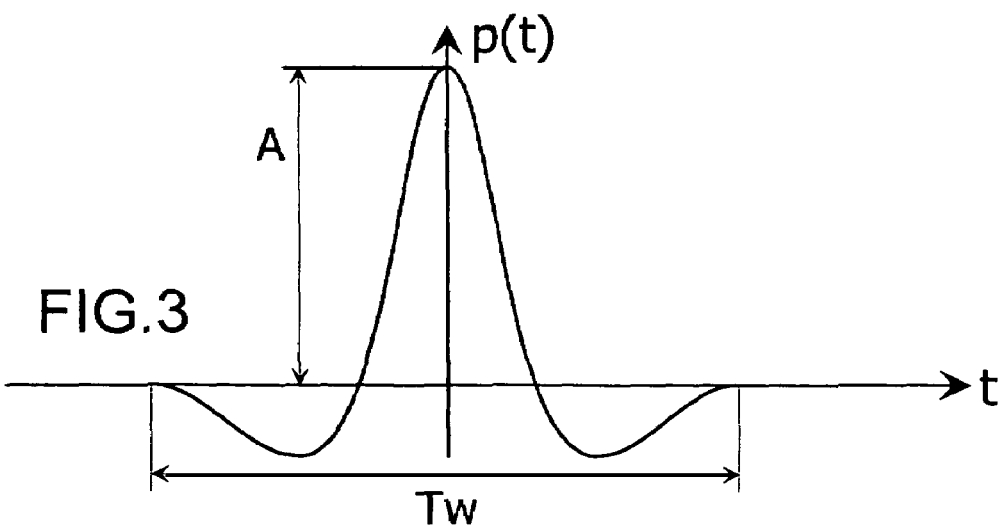
FIG. 3 is a chronogram depicting a pulse model which may be used for generating such a sequence.

FIG. 3 is another chronogram which depicts a possible shape p(t) which may be chosen for constituting the above-mentioned pulses. Pulses pj(t) (for j=1 to Ns) of a same sequence may have different shapes, provided that they all have essentially a same width and carry a same quantity of energy. All pulses pj(t) (for j=1 to Ns) belonging to a same sequence may, however, have a same shape such as the shape p(t) depicted here, which is defined as a derivative of the second order of a Gaussian function, which may be expressed mathematically as:

$$p(t) = A \cdot [1 - 4\pi(t/Tw)^2] \cdot \exp(-2\pi(t/Tw)^2).$$

Other pulse shapes known to those skilled in the art may, of course, be used in this same purpose.

Figure 4:
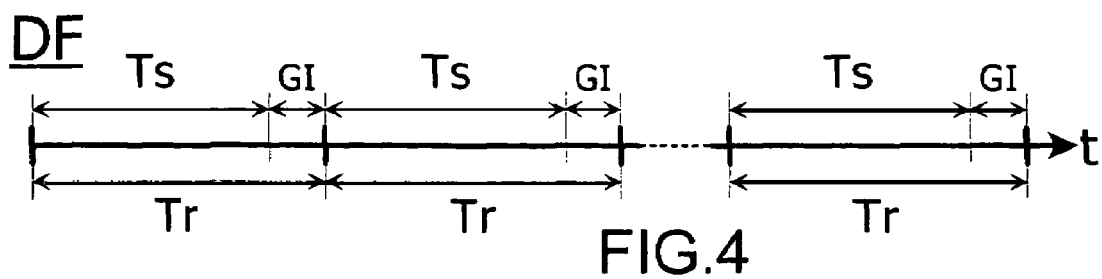
FIG. 4 is a chronogram depicting a data frame including a plurality of pulse sequences.

FIG. 4 is yet another chronogram which depicts a dataframe DF formed by successive pulse sequences such as the one described above, each having a total duration Ts, a guard interval GI being periodically inserted between two such sequences in order to prevent alteration of a given sequence by a following one, which alterations coud be caused, for example, by intermodulation products between said pulse sequences. This dataframe DF is thus constituted by successive frames having each a duration Tr, whith Tr=Ts+GI, and including each a pulse sequence as described above.

A device intended to receive such a data frame DF must thus only be able to measure quantities representative of the successive amounts of power carried by the successive pulse sequences in order to identify the informational content of the dataframe DF, without having to map precisely, with respect to time, the received pulse sequences.

Figure 5:
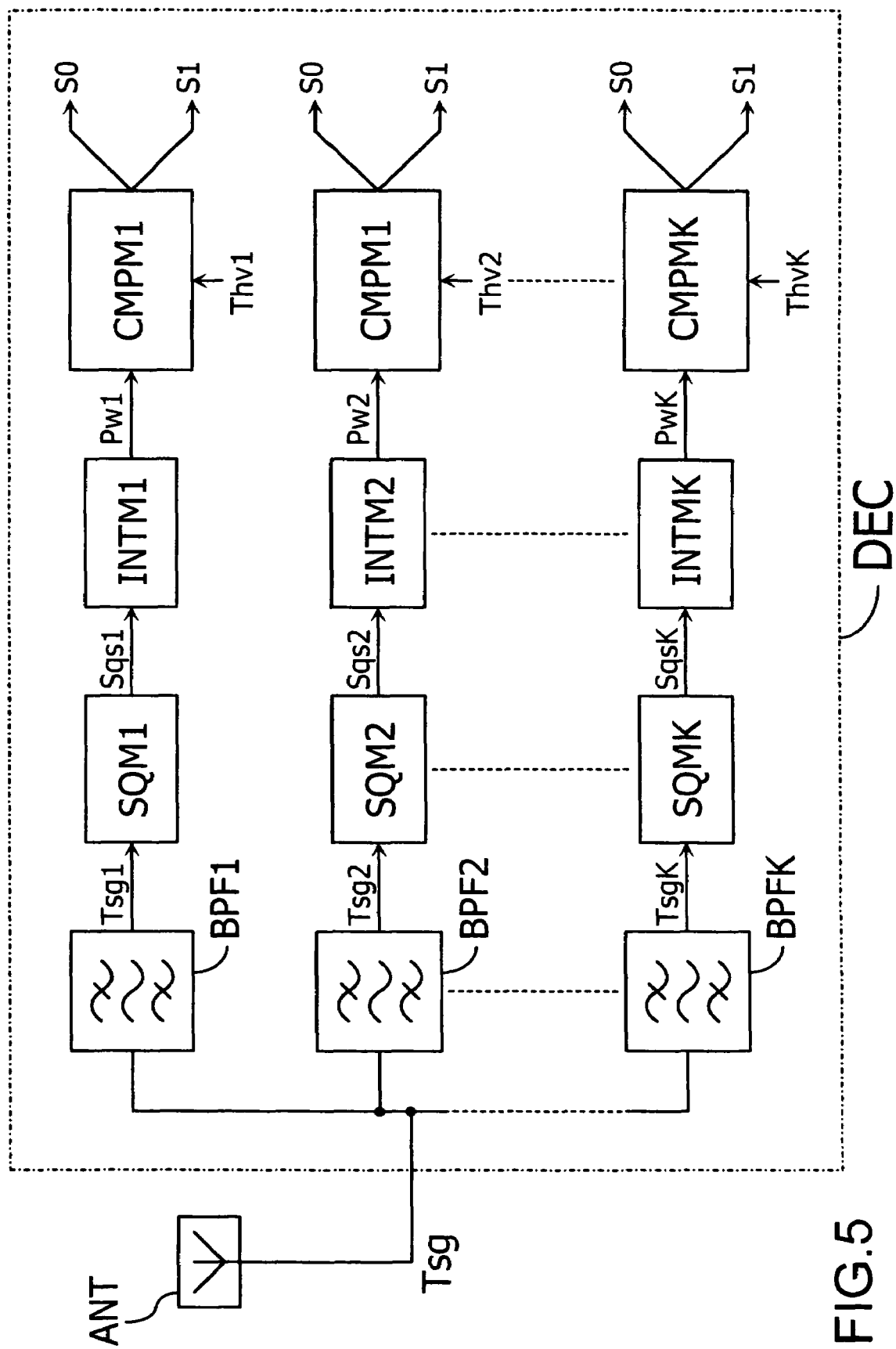
FIG. 5 is a block diagram depicting symbol decoding means included in a receiver in which a variant of the invention is embodied.

FIG. 5 depicts symbol decoding means DEC included in a receiver according to an alternative embodiment of the invention, in which embodiment the transmitted signal Tsg is a composite signal including a combination of K pulse sequences as described hereinbefore, each pulse sequence having thus been subjected to a symbol encoding step at the transmitting end. This receiver includes an antenna device ANT intended to receive such a composite signal Tsg. The decoding means DEC include an array of K band-pass filters PBFk (for k=1 to K) intended to separate from each other K sub-bands into which a total bandwidth used for transmitting the composite signal Tsg has been divided in order to define K different pulse sequences intended each to carry a specific symbol.

This variant of the invention enables to transmit simultaneously several symbols through a same communication channel, and thus to significantly increase the throughput of a telecommunication system in which such a variant of the invention is embodied.

In such an embodiment, each pulse sequence corresponding to a given sub-band of rank k (with k=1 to K) will be expressed as:

$$Tsgk(t) = \sum_{i,j} Vki \cdot \alpha kj \cdot pkj(t - ckj - j \cdot Tf - dtki),$$

with $$Tsg(t) = \sum_{k} Tsgk(t)$$

In the embodiment of the invention depicted here, the symbol decoding means DEC include an array of K squaring modules SQMk (with k=1 to K), each of which being connected to one of the band-pass filters BPFk and intended to receive a pulse sequence Tsgk (with k=1 to K) and to deliver a signal Sqsk constituted by a square of said signal Tsgk.

The symbol decoding means DEC further include an array of K integrating modules INTk (with k=1 to K), each of which being connected to one of the squaring modules SQMk and intended to deliver a power value Pwk representative of an amount of power carried by the corresponding pulse sequence Tsgk. Such a power value Pwk may for example be computed as the integral, on the duration of the channel delay, of the square signal Sqsk delivered by the related squaring module SQMk.

The symbol decoding means DEC also include an array of K comparing modules CMPMk (with k=1 to K), each of which being connected to one of the integrating modules INTk and intended to compare the power value Pwk to be delivered by said integrating module INTk with a predetermined threshold value Thvk, which may be different from one comparing module to another.

The symbol carried by a given pulse sequence Tsgk will thus be identified in a very straightforward manner, according to a simple decoding grid which may be expressed as follows:

If Pwk<Thvk, then the symbol carried by pulse sequence Tsgk is S0; and

If Thvk<Pwk, then the symbol carried by pulse sequence Tsgk is S1.

Each squaring module SQMk may be formed by a Gilbert cell fed with identical input signals. Each integrating module INTk may be formed by an operational amplifier provided with an RC feedback. Each comparing module CMPMk may be formed by an operational amplifier intended to receive a given power value Pwk and the predermined threshold value Thvk assigned to this comparing module CMPMk. The symbol decoding means DEC may thus be formed by off-the-shelf analog circuits, which analog circuits are known for their high processing speed and do not require any sampling, as opposed to digital solutions, which will enable to further reduce the processing power and the time required for performing a signal decoding step according to this embodiment of the invention.

Each predermined threshold value could be predefined and for example set at ½ or ¾ if Vki is to be chosen among integer values 0 and 1. The inventors have observed, however, that such fixed thresholds, which do not take into account communication conditions between the transmitter end the receiver may generate decoding errors. The inventors thus have designed a thresholding scheme based on an equating of two probability densities, each taking into account real-time communication conditions, so that neither gray zone nor overlap will exist between two interpreting conditions.

Several expressions of first and second probability densities can be derived from existing art in the field of mathematics applied to optics. The inventors have, more specifically, singled out probability densities yielded by a so-called "Chi-square" theory, which gives, when applied by the inventors to the field of UWB transmission, the following expressions for a first probability density p0 representing a likelihood for the transmitted signal to carry a value Vki equal to 0 and a second probability density p1 representing a likelihood for the transmitted signal to carry a value Vki equal to 1:

$$\begin{cases} p0(x) = \frac{1}{\Gamma(M)}\left(\frac{x}{N}\right)^{M-1} \cdot \exp\left(-\frac{x}{N}\right) \\ p1(x) = \left(\frac{x}{E}\right)^{(M-1)/2} \cdot I_{M-1}\left(2\frac{\sqrt{x \cdot E}}{N}\right) \cdot \exp\left(-\frac{x+E}{N}\right) \end{cases}$$

where $\Gamma$ denotes the Euler function and Ij the jth Bessel function of the first kind, N being a first parameter representative of a noise intensity adversely affecting the transmission of said signal, E being a second parameter representative of an amount of power which would be carried by a pulse sequence free of all noise, and M being defined by M=(2.B.Ns.Ti+1)/2, where B is a bandwidth of the pulse sequence for which the threshold value is computed.

Figure 6:
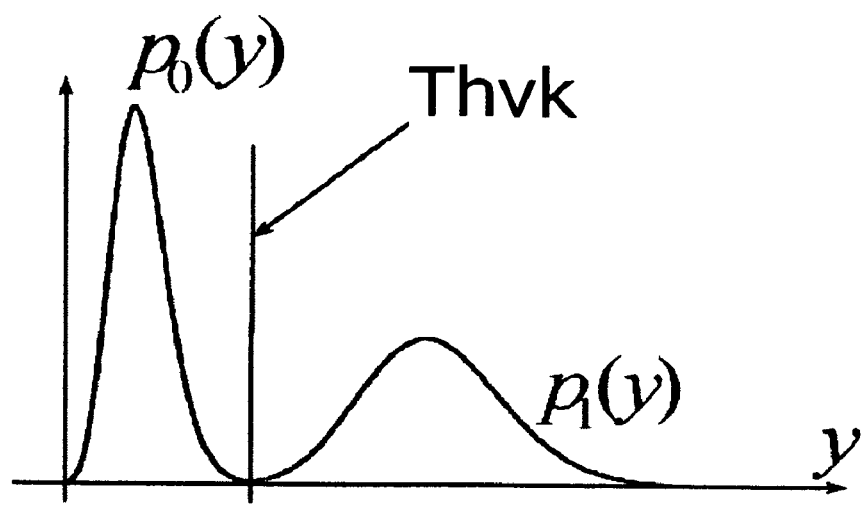
FIG. 6 is a diagram depicting how a threshold value may be computed according to the invention.

FIG. 6 illustrates the equating p0=p1 of the probability densities defined in the above equation system, to which a threshold value Thvk will provide an optimal solution or, depending on the embodiment chosen for implementing the invention, an approximated solution.

According to a particular embodiment of the invention, the threshold value is defined by a polynomial of a variable $M^{1/2}$, which is an approximation of the solution of the above equation system and enables to avoid the computation of an optimal solution to said system. This polynomial will preferably be limited to the second order in order to achieve a suitable balance between computing complexity and decoding efficiency, and may be expressed as:

$$Thvk = N \cdot \left[\frac{L}{4} + \phi(L) \cdot \sqrt{M-1} + M\right], \text{ where } L = E/N.$$

This formula has been singled out by the inventors as providing the best results in terms of computing costs with respect to decoding precision.

This expression has been derived by the inventors from the above mentioned equation system by using $K \cdot x^{-1/2} \cdot \exp(x)$ as asymptotic equivalent of $I_{M-1}(x)$ for a fixed positive value of K and a large value of x. The term −1 included in the first order variable of the polynomial of $M^{1/2}$ stems from the mathematical manipulations of the above described equation system and may be dispensed with in other, sub-optimal embodiments of the invention. This expression enables a relatively simple dynamic update of the predetermined threshold value, which will allow to take into account possible variations of communication conditions expressed by variations of the values of M and L.

Figure 7:
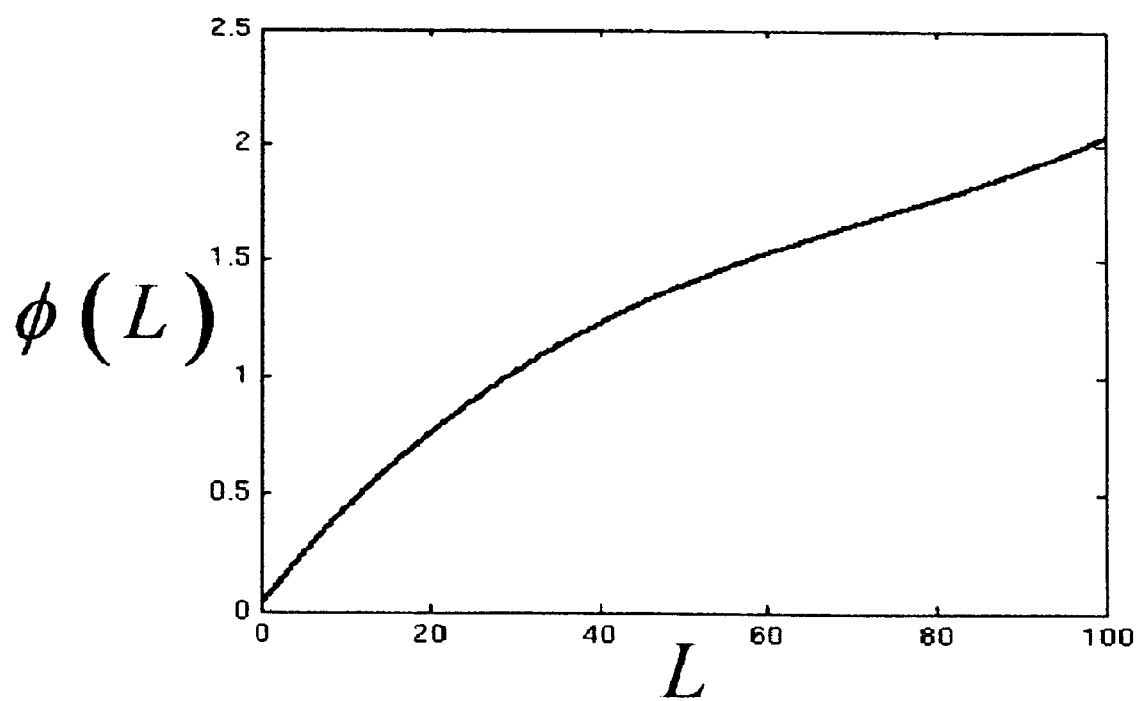
FIG. 7 is a diagram depicting a tabulated function which may be used for computing such a threshold value according to a specific embodiment of the invention.

According to the preferred embodiment of the invention described above, the first-order coefficient of the polynom defining the threshold value Thvk, i.e. the coefficient in front of the $(M-1)^{1/2}$ term, is given by an ordinate of a tabulated curve whose abcissis is formed by an energy ratio between the second and first parameters L=E/N related to the transmission of the relevant pulse sequence, which curve is shown on FIG. 7.

The computation of the optimal threshold value defined by the scheme described above thus involves prior knowledge of the first and second parameters N and E, which are representative of the communication conditions having affected the transmission of the received pulse sequence in relation with which a power value will be compared to said threshold value.

Figure 8:
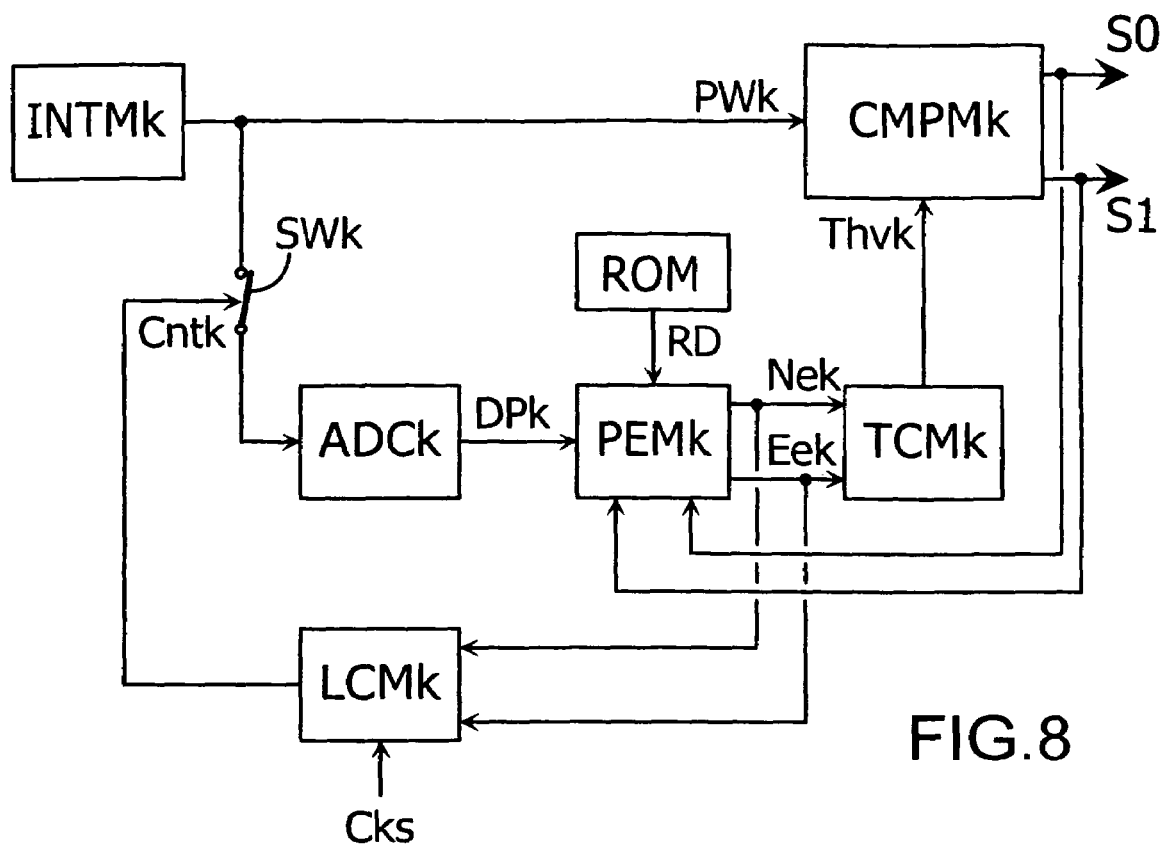
FIG. 8 is a block diagram depicting parameter estimation means according to a prefered embodiment of the invention.

FIG. 8 depicts how estimated values Nek and Eek of the first and second parameters N and E may be computed in order to allow determination of an optimal threshold value Thvk to which a power value PWk delivered by an integrating module INTk (with k=1 to K) as described above is to be compared by a comparing module CMPMk.

During a first stage, successive power values PWk will be representative of data successively encoded in a frame of reference pulse sequences, representative of reference data RD belonging to a reference frame previously memorized within the receiving device, in this example within a Read-Only memory ROM. A plurality of symbol decoding steps, will thus produce successive power values PWk related each to one of the pulse sequences included in the reference frame.

An initial parameter estimation step will then produce estimated values Nek and Eek of the first and second parameters on the basis of the successive power values Pwk, and of the previous knowledge of the structure of the reference frame.

If, for example, the reference data frame includes an integer number L0 of bits having a value "S0" encoded according to an On-Off Keying scheme by an absence of pulses and a number L1 of bits having a value "S1" encoded according to said On-Off Keying scheme by a presence of pulses, estimated values Nek and Eek of the first and second parameters N and E may be expressed as:

$$Nek = \frac{1}{M} \frac{\sum_{l=1}^{L0} DPkl}{L0}$$

and $$Eek = \frac{\sum_{l=1}^{L1} DPkl}{L1} - M \cdot Nek$$

where each DPkl (for l=1 to L0+L1) is one of successive power values delivered by the integrating module INTMk, via an analog-to-digital converter ADC, in relation with one of the reference pulse sequences received by the device in which the invention is embodied.

The computation of the estimated values Nek and Eek of the first and second parameters N and E according to the above expressions is performed by parameter estimation means PEMk, said estimated values Nek and Eek being then delivered to threshold computation means TCMk intended to produce the threshold value Thvk by applying the above described formula $$Thvk = N \cdot \left[ \frac{L}{4} + \phi(L) \cdot \sqrt{M-1} + M \right]$$

This advantageous embodiment of the invention thus only requires transmission of a single frame of reference pulse sequences for allowing a decoding of all following data frames.

The estimated values Nek and Eek of the first and second parameters N and E may be computed once and for all for the whole duration of a communication following the analysis of the received reference pulse sequences, in cases where the noise level may be considered constant during a same communication, since it essentially depends on temperature. The preferred embodiment of the invention showed here allows, however, a dynamic adjustment of said estimated values Nek and Eek, which will enable to take into account changes in the communication conditions affecting data transmission during an ongoing communication. In order to achieve such a dynamic adjustment, the parameter estimation means will be able to perform at least one parameter tuning step for updating previously computed estimated values Nek and Eek of the first and second parameters E and N on the basis of at least one new power value DPk produced after computation of the previous estimated values.

The operation of such a parameter tuning step may be described as follows:

If a new power value $DPk_{l+1}$, constituting an (l+1)th sample, corresponds to a case where a related power value $PWk_{l+1}$ has been found lower than a current threshold value $Thvk_{l+1}$, which may for example be expressed by the production of a value "0" for S1 and a value "1" for S0 by the comparing module CMPMk, a new estimated value $Nek_{l+1}$ may be deduced from a previous value $Nek_l$ by means of the following recursive formula:

$$Nek_{l+1} = \frac{l}{l+1} Nek_l + \frac{DPk_{l+1}}{(l+1) \cdot M}$$

Since the noise level remains nearly constant during a same communication, the recursive formula given above allows to compute an estimated values Nek of the first parameter N with an error which tends towards zero when the number l of samples becomes very large.

If a new power value $DPk_{l+1}$ corresponds to a case where a related power value $PWk_{l+1}$ has been found higher than a current threshold value $Thvk_{l+1}$, which may for example be expressed by the production of a value "1" for S1 and a value "0" for S0 by the comparing module CMPMk, a new estimated value $Eek_{l+1}$ may be deduced from a previous value $Eek_l$ by means of the following recursive formula:

$$Eek_{l+1} = \frac{l}{l+1} Eek_l + \frac{DPk_{l+1} - M \cdot N}{l+1}$$

where N will either be constituted by a constant estimated value produced during the initial estimation step, or by the current estimated value $Nek_l$.

According to the recursive formula given above, changes induced by a tuning performed when l has a high value, i.e. after numerous samples, will be negligible.

The inventors thus propose another recursive formula in which the recursive gain is constant, so that each new sample will have a same tuning impact than the previous one:

$$Eek_{l+1} = \left(1 - \frac{1}{A}\right) \cdot Eek_l + \frac{DPk_{l+1} - M \cdot N}{A},$$

where A is a predetermined real value.

This recursive formula enables to track variations of the real value of the second parameter E, which occur when propagation conditions change as a consequence of a mobility of the transmitter with respect to the receiver or vice-versa.

According to a particular embodiment of the invention, the above-described tuning of estimated values Nek and Eek of the first and second parameters N and E may be selectively inhibited by means of a control switch SWk preveting the supply of any new analog power value PWk to the analog-to-digital converter ADC, and thus preventing the parameter estimating means PEMk to receive new input values DPk.

Such a control switch SWk will be controlled by a control signal Cntk supplied by a logic control module LCMk. The switch SWk may for example be opened after a predetermined time duration corresponding to a predetermined number of pulses of a clock signal Cks will have elapsed since the execution of the initial parameter estimation step. The switch SWk may also, according to an alternate or cumulative variant of the above-described embodiment, be opened if it appears that the estimated values Nek and Eek of the first and second parameters N and E remain almost constant, which may be established if successive differences between successive estimated values remain lower than a predetermined difference threshold.

The invention claimed is:

1. A method for receiving data in a pulse sequence carried by a radio signal, the method comprising:
   determining a threshold value based on a bandwidth of the pulse sequence;
   decoding, at a receiving end, a power value representative of an amount of power carried by the pulse sequence;
   comparing the amount of power to the threshold value;
   estimating a first parameter representative of noise affecting the transmission of the radio signal; and
   estimating a second parameter representative of an amount of power which would be carried by the pulse sequence in the absence of noise,
   wherein the estimating the first parameter and the estimating the second parameter are performed before the determining.

2. The method as claimed in claim 1, wherein an estimated value of the first parameter is used for performing the estimation of the second parameter.

3. The method as claimed in claim 1 or 2, further comprising:
   transmitting a frame of reference pulse sequences by said radio signal;
   a plurality of symbol decoding steps, each producing a power value related to one of the pulse sequences included in the reference frame; and
   estimating values of the first and second parameters based on power values related to pulse sequences included in the reference frame, and the data carried by the reference pulse sequences, wherein the data is memorized at the receiver end.

4. The method as claimed in claim 3, further comprising:
   updating previously computed estimated values of the first and second parameters on the basis of at least one new power value produced after computation of the previous estimated values.

5. The method as claimed in claim 1, wherein the threshold value is defined by a polynomial of a variable $M^{1/2}$, where M is defined by $M=(2.B.Ns.Ti+1)/2$, B is a bandwidth of the pulse sequence for which the threshold value is computed, Ns is a number of pulses included in the pulse sequence, and Ti is a time duration over which an integration of each pulse belonging to said pulse sequence is performed in order to produce the power value related to said pulse sequence.

6. The method as claimed in claim 5, wherein the polynomial defining the threshold value is limited to the second order.

7. The method as claimed in claim 6, wherein a first-order coefficient of the polynomial defining the threshold value is given by an ordinate of a curve whose abscissa is formed by a ratio between the second and first estimated values related to the transmission of the relevant pulse sequence.

8. The method as claimed in claim 1, further comprising:
   at least one symbol encoding step executed before transmission of said pulse sequence, and during each symbol encoding step the pulse sequence is multiplied by one of two integer values representative of a symbol to be carried by said pulse sequence.

9. The method as claimed in claim 8, wherein each transmitted signal includes a superimposition of a predetermined number of pulse sequences, each pulse sequence having been subjected to a symbol encoding step and corresponding to one of several sub-bands into which a bandwidth available for transmission has previously been divided.

10. The method according to claim 1, further comprising:
    determining the data carried by a pulse in the at least one pulse sequence based on a result of the comparing.

11. The method as claimed in claim 10, wherein
    the determining a threshold value includes equating a first probability density representing the likelihood that the data carried by the pulse is 0 with a second probability density representing the likelihood that the data carried by the pulse is 1.

12. A telecommunication system comprising:
    a transmitter configured to transmit data in a radio signal including a pulse sequence;
    a receiver including a decoder configured to determine a threshold value based on a bandwidth of the pulse sequence, and decode a power value representative of an amount of power carried by the pulse sequence;
    a comparing unit configured to compare said power value to the threshold value; and
    an estimating unit configured to estimate
      a first parameter representative of noise affecting the transmission of the radio signal, and
      a second parameter representative of an amount of power which would be carried by each pulse sequence in the absence of noise,
    wherein the estimating unit is configured to estimate the first parameter and the second parameter before the decoder determines the threshold value.

13. A device configured to receive data in a pulse sequence carried by a radio signal, the device comprising:
    a decoder configured to determine a threshold value based on a bandwidth of the pulse sequence, and decode a power value representative of an amount of power carried by the pulse sequence;
    a comparing unit configured to compare said power value to the threshold value; and
    an estimating unit configured to estimate
      a first parameter representative of noise affecting the transmission of the radio signal, and
      a second parameter representative of an amount of power which would be carried by each pulse sequence in the absence of noise,
    wherein the estimating unit is configured to estimate the first parameter and the second parameter before the decoder determines the threshold value.

* * * * *